US008712237B2

(12) United States Patent
Jenkins et al.

(10) Patent No.: US 8,712,237 B2
(45) Date of Patent: Apr. 29, 2014

(54) METHOD AND APPARATUS FOR REDUCING COST OF OPTICAL AMPLIFICATION IN A NETWORK

(75) Inventors: David W. Jenkins, North Aurora, IL (US); Ramasubramanian Anand, Plainfield, IL (US); Hector Ayala, Chicago, IL (US); Julia Y. Larikova, Naperville, IL (US); Kenneth M. Fisher, Aurora, IL (US)

(73) Assignee: Tellabs Operations, Inc., Naperville, IL (US)

( * ) Notice: Subject to any disclaimer, the term of this patent is extended or adjusted under 35 U.S.C. 154(b) by 948 days.

(21) Appl. No.: 12/228,763

(22) Filed: Aug. 15, 2008

(65) Prior Publication Data

US 2010/0040364 A1 Feb. 18, 2010

(51) Int. Cl.
*H04B 10/08* (2011.01)

(52) U.S. Cl.
USPC ............... 398/26; 398/37; 398/140; 398/159; 398/160

(58) Field of Classification Search
USPC ................. 398/25, 26, 37, 173, 175, 180
See application file for complete search history.

(56) References Cited

U.S. PATENT DOCUMENTS

| 5,027,079 | A | 6/1991 | Desurvire et al. | |
|---|---|---|---|---|
| 5,720,607 | A | 2/1998 | Morio et al. | |
| 6,323,994 | B1 * | 11/2001 | Li et al. | 359/341.1 |
| 6,459,594 | B1 | 10/2002 | Tsuji et al. | |
| 6,466,972 | B1 | 10/2002 | Paul et al. | |
| 6,834,109 | B1 | 12/2004 | Pare, Jr. et al. | |
| 6,952,529 | B1 | 10/2005 | Mittal | |
| 7,038,837 | B2 * | 5/2006 | Ng et al. | 359/333 |
| 7,046,426 | B2 * | 5/2006 | Ng et al. | 359/333 |
| 7,047,496 | B2 | 5/2006 | Nelles et al. | |
| 7,096,176 | B1 * | 8/2006 | Hess | 703/21 |
| 7,096,502 | B1 * | 8/2006 | Fox et al. | 726/25 |
| 7,623,785 | B2 | 11/2009 | Krishnaswamy et al. | |
| 7,684,696 | B1 * | 3/2010 | Hadden et al. | 398/25 |
| 7,697,455 | B2 | 4/2010 | Sadanada | |

(Continued)

FOREIGN PATENT DOCUMENTS

WO    WO 01/47170 A2    6/2001

OTHER PUBLICATIONS

U.S. Appl. No. 11/354,705, filed Feb. 14, 2006.
U.S. Appl. No. 12/228,762, filed Aug. 15, 2008.

(Continued)

*Primary Examiner* — David Payne
*Assistant Examiner* — Tanya Motsinger
(74) *Attorney, Agent, or Firm* — Hamilton, Brook, Smith & Reynolds, P.C.

(57) ABSTRACT

Signals propagating in wavelength division multiplexing (WDM) optical networks suffer from loss, which decreases optical signal-to-noise ratios (OSNRs) and degrades a quality of received transmissions. Present methods of boosting OSNRs involve regeneration using transponders, which scale in complexity with the number of WDM channels. Optical amplifiers may boost signal strength, but amplified spontaneous emission (ASE) noise often reduces OSNR despite increases in signal strength, although changing the amplifier operating settings may reduce emitted ASE noise power. A method or corresponding apparatus in an example embodiment of the present invention provides a planning tool for deploying optical amplifiers in an optical network in a manner that reduces the need for optical regeneration, reducing cost and complexity of the deployed network. In one embodiment, the disclosed planning tool may substitute models of high-gain amplifiers operating at low settings for models of low-gain amplifiers operating at high settings.

30 Claims, 9 Drawing Sheets

(56) References Cited

U.S. PATENT DOCUMENTS

| | | | |
|---|---|---|---|
| 8,078,435 B2 | 12/2011 | Jenkins et al. | |
| 8,447,181 B2* | 5/2013 | Jenkins et al. | 398/48 |
| 2002/0089863 A1 | 7/2002 | Yasumura | |
| 2003/0020977 A1 | 1/2003 | Smith et al. | |
| 2003/0071985 A1 | 4/2003 | Mori et al. | |
| 2003/0099018 A1 | 5/2003 | Singh et al. | |
| 2004/0016002 A1 | 1/2004 | Handelman et al. | |
| 2004/0143428 A1* | 7/2004 | Rappaport et al. | 703/22 |
| 2004/0186701 A1* | 9/2004 | Aubin et al. | 703/13 |
| 2004/0208535 A1* | 10/2004 | Bragg et al. | 398/38 |
| 2004/0208576 A1 | 10/2004 | Kinoshita et al. | |
| 2004/0214577 A1* | 10/2004 | Borst et al. | 455/446 |
| 2004/0251962 A1* | 12/2004 | Rosnell et al. | 330/134 |
| 2005/0036788 A1* | 2/2005 | Matsuoka et al. | 398/81 |
| 2005/0041600 A1* | 2/2005 | Moffatt et al. | 370/254 |
| 2005/0066016 A1 | 3/2005 | Bailey et al. | |
| 2005/0123027 A1 | 6/2005 | Cioffi et al. | |
| 2005/0175279 A1* | 8/2005 | Nakajima et al. | 385/24 |
| 2005/0220136 A1 | 10/2005 | Shinomiya et al. | |
| 2006/0019679 A1* | 1/2006 | Rappaport et al. | 455/456.5 |
| 2006/0067694 A1 | 3/2006 | Nozu | |
| 2006/0287740 A1 | 12/2006 | Ertel | |
| 2007/0172040 A1 | 7/2007 | Cesarini et al. | |
| 2007/0183022 A1 | 8/2007 | Abbott | |
| 2007/0294342 A1* | 12/2007 | Shah et al. | 709/203 |
| 2008/0123586 A1 | 5/2008 | Manser | |
| 2008/0279552 A1 | 11/2008 | Ou et al. | |
| 2009/0144700 A1 | 6/2009 | Huff et al. | |
| 2010/0040364 A1 | 2/2010 | Jenkins et al. | |
| 2010/0040365 A1* | 2/2010 | Kit Leung | 398/26 |
| 2010/0040366 A1 | 2/2010 | Jenkins et al. | |
| 2010/0042390 A1 | 2/2010 | Jenkins et al. | |
| 2010/0042989 A1 | 2/2010 | Anand et al. | |
| 2010/0142943 A1* | 6/2010 | Frankel et al. | 398/25 |
| 2010/0303473 A1 | 12/2010 | Alfiad et al. | |

OTHER PUBLICATIONS

U.S. Appl. No. 12/228,776, filed Aug. 15, 2008.

U.S. Appl. No. 12/228,826, filed Aug. 15, 2008.

Momtahan, P., "The Case for Integrating Next-Generation Transport," (White Paper 74.1707E) Tellabs, (Rev. B: Feb. 2007).

Jenkins, D. W. and Scholtens, D. A., "Metro WDM Network Design & Evolution: Positioning for the Transition to Optical Meshes," (White Paper 74.1717E), Tellabs, (Rev. A: Oct. 2006).

Papakos, K., et al., "Optical Dynamic Core Networks: Design, Implementation and Engineering Considerations,"(White Paper 74.1825E) Tellabs, (Rev. A: Apr. 2007).

"BER vs. OSNR," *Circadiant Tech Brief,* (Tech Brief No. TB007), (Feb. 2003).

Gariépy, D. and Gang, H., "Measuring OSNR in WDM Systems—Effects of Resolution Bandwidth and Optical Rejection Ratio," EXFO Electro-Optical Engineering Inc., Application Note 098, (May 2005).

çokrak, A.Cem and Altuncu, A., "Gain and Noise Figure Performance of Erbium Doped Fiber Amplifiers (EDFA)," *J. of Electrical & Electronics Engineering (Istanbul University)*, 4(2):1111-1122 (Jun. 15, 2004).

Notice of Abandonment, U.S. Appl. No. 11/354,705, Date of mailing: Sep. 27, 2010.

Office Action, U.S. Appl. No. 12/228,776, Date of mailing: Nov. 9, 2011.

Office Action, U.S. Appl. No. 12/228,826, Date of mailing: Sep. 6, 2011.

Office Action, U.S. Appl. No. 12/228,826, Date of mailing: Mar. 2, 2012.

\* cited by examiner

| ClockWise | OSNR MARGIN (dB) | | | | | | | | |
|---|---|---|---|---|---|---|---|---|---|
| | A | B | C | D | E | F | G | H | I |
| A |  | 11.76 | 10.24 | 8.57 | 7.25 | 6.32 | 4.92 | 4.31 | 3.77 |
| B | 3.77 |  | 15.53 | 11.43 | 9.18 | 7.84 | 5.99 | 5.24 | 4.61 |
| C | 4.13 | 3.37 |  | 13.55 | 10.34 | 8.67 | 6.54 | 5.72 | 5.03 |
| D | 4.72 | 3.88 | 3.53 |  | 13.14 | 10.39 | 7.53 | 6.54 | 5.74 |
| E | 5.45 | 4.49 | 4.11 | 3.57 |  | 13.66 | 8.94 | 7.64 | 6.65 |
| F | 6.20 | 5.09 | 4.68 | 4.09 | 3.52 |  | 10.72 | 8.9 | 7.64 |
| G | 8.13 | 6.54 | 5.99 | 5.25 | 4.54 | 3.97 |  | 13.55 | 10.62 |
| H | 9.61 | 7.53 | 6.87 | 5.99 | 5.18 | 4.55 | 3.53 |  | 13.69 |
| I | 11.76 | 8.75 | 7.91 | 6.84 | 5.89 | 5.18 | 4.04 | 3.52 |  |

FIG. 2A

| CounterCW | OSNR MARGIN (dB) | | | | | | | | |
|---|---|---|---|---|---|---|---|---|---|
| | A | B | C | D | E | F | G | H | I |
| A |  | 3.77 | 4.13 | 4.72 | 5.45 | 6.2 | 8.13 | 9.61 | 11.76 |
| B | 11.76 |  | 3.37 | 3.88 | 4.49 | 5.09 | 6.54 | 7.53 | 8.75 |
| C | 10.24 | 15.53 |  | 3.53 | 4.11 | 4.68 | 5.99 | 6.87 | 7.91 |
| D | 8.57 | 11.43 | 13.55 |  | 3.57 | 4.09 | 5.25 | 5.99 | 6.84 |
| E | 7.25 | 9.18 | 10.34 | 13.14 |  | 3.52 | 4.54 | 5.18 | 5.89 |
| F | 6.32 | 7.84 | 8.67 | 10.39 | 13.66 |  | 3.97 | 4.55 | 5.18 |
| G | 4.92 | 5.99 | 6.54 | 7.53 | 8.94 | 10.72 |  | 3.53 | 4.04 |
| H | 4.31 | 5.24 | 5.72 | 6.54 | 7.64 | 8.9 | 13.55 |  | 3.52 |
| I | 3.77 | 4.61 | 5.03 | 5.74 | 6.65 | 7.64 | 10.62 | 13.69 |  |

FIG. 2B

| LINK | A-B | B-C | C-D | D-E | E-F | F-G | G-H | H-I | I-J | J-K | K-L |
|---|---|---|---|---|---|---|---|---|---|---|---|
| DISTANCE (km) | 55.2 | 94.0 | 130.0 | 56.0 | 59.0 | 48.0 | 62.7 | 60.0 | 29.0 | 83.0 | 55.0 |
| LOSS (dB) | 13.8 | 23.5 | 32.5 | 14.0 | 14.8 | 12.0 | 15.7 | 15.0 | 7.3 | 20.8 | 13.8 |

FIG. 5A

| DESTINATION NODE | B | C | D | E | F | G | H | I | J | K | L |
|---|---|---|---|---|---|---|---|---|---|---|---|
| AMPLIFIER TYPE | MID | HIGH | LOW | LOW | LOW | LOW | LOW | LOW | MID | LOW | LOW |
| CW OSNR MARGIN (dB) | 22.9 | 11.7 | 7.0 | 3.3 | 3.0 | -0.7 | -1.9 | -1.9 | -2.0 | -2.3 | -3.7 |
| CCW OSNR MARGIN (dB) | -2.8 | -2.4 | -2.2 | -1.8 | -1.0 | -0.9 | 2.7 | 7.1 | 7.1 | 8.3 | 13.9 |

FIG. 5B

| DESTINATION NODE | B | C | D | E | F | G | H | I | J | K | L |
|---|---|---|---|---|---|---|---|---|---|---|---|
| AMPLIFIER TYPE | HIGH | HIGH | MID | MID | MID | MID | MID | LOW | HIGH | MID | MID |
| CW OSNR MARGIN (dB) | 29.8 | 11.9 | 11.9 | 11.8 | 11.8 | 11.7 | 11.6 | 11.6 | 11.4 | 11.3 | 11.2 |
| CCW OSNR MARGIN (dB) | 11.0 | 11.3 | 19.6 | 20.0 | 20.5 | 20.9 | 21.7 | 22.5 | 22.9 | 27.0 | 19.9 |

FIG. 5C

METHOD AND APPARATUS FOR REDUCING COST OF OPTICAL AMPLIFICATION IN A NETWORK

RELATED APPLICATIONS

This application is related to U.S. patent application Ser. No. 11/354,705, filed on Feb. 14, 2006; entitled "Method and Apparatus for Designing Any-To-Any Optical-Signal-to-Noise Ratio in Optical Networks;" entitled "Method and Apparatus for Displaying and Identifying Available Wavelength Paths Across a Network;" entitled "Method and Apparatus for Simplifying Planning and Tracking of Multiple Installation Configurations;" each of which is being filed concurrently. The entire teachings of the above applications are incorporated herein by reference.

BACKGROUND OF THE INVENTION

Deploying optical network elements (ONEs) to form an optical network is a difficult and expensive proposition: network providers need to correctly anticipate customer demand while building reliable networks as inexpensively as possible. In addition, network providers must also anticipate future technological developments, such as increased data rates, to simplify network upgrades. In part, network providers attempt to minimize cost and reduce network complexity by deploying ONEs, such as optical amplifiers, in a way that minimizes the required power while ensuring sufficient signal fidelity.

In digital communication schemes, such as those employed in optical networks, signal fidelity may be characterized by a bit error rate (BER). Simply put, the BER is defined by how frequently a receiver detects a bit incorrectly, that is, how often the receiver mistakes a representation of a logical '1' for a representation of a logical '0' or vice versa. Lower BERs are better; ideal (i.e., noise-free) receivers operate with BERs of zero (0), but shot noise and thermal noise at real receivers cause bit detection errors, raising BERs to measurable levels.

Currently, the target BER for optical networks is on the order of $10^{-12}$. To meet the target BER, network providers must guarantee a minimum optical signal-to-noise ratio (OSNR) at the receiver. The OSNR is usually defined as the ratio of the optical signal power $P_s$ to the optical noise power $P_n$ in a given channel bandwidth, $$OSNR = 10 \cdot \log_{10}\left(\frac{P_s}{P_n}\right). \qquad \text{Equation 1}$$

For digital signals, the detected power switches between a high level and a low level at a given data, or bit rate. In optical networks, the high and low levels can be defined in terms of a number of photons: for example, a 5 mW, 40 GHz optical signal in the Wavelength Division Multiplexing (WDM) C band may have a corresponding high level of about $10^6$ photons and a low level of 0 photons. In a shot-noise limited receiver, a signal of $10^6$ photons has an OSNR of 30 dB.

Because bits can be defined in terms of photons, the bit rate can be defined in terms of photons per second. As the bit rate increases, the number of photons per bit decreases given a constant optical power (i.e., spreading a constant number of photons per second over a larger number of bits per second reduces the photons per bit). The increased bit rate also leads to a decreased OSNR—the bandwidth increases, but the signal power remains constant, whereas the receiver noise power increases given a relatively constant noise power spectral density. Eventually, increasing the bit rate depresses the OSNR too far, pushing the BER above acceptable levels. In optical networks that use direct detection, the BER is related to the OSNR according to the relation $$BER \square \frac{1}{2} \cdot \log_{10}(OSNR), \qquad \text{Relation 2}$$

where the OSNR is in linear units. As shown in Relation 2, maintaining a minimum BER while increasing the bit rate requires increasing the OSNR.

As light propagates through a network, however, it is absorbed and scattered, reducing the signal power and the OSNR. In addition, signals propagating through optical fiber suffer from loss due to four-wave mixing, chromatic dispersion, and polarization mode dispersion, further reducing the OSNR. In long-haul and metro optical networks, optical amplification boosts the signal power, but may also add amplified spontaneous emission (ASE) noise, potentially offsetting any increase in OSNR. Because ASE noise spreads over a very broad bandwidth and OSNR depends on the noise power in a given bandwidth, ASE noise does not directly contribute to the OSNR. Instead, the ASE noise beats against the signal at the photodetector, producing a noise current near the frequency of the detected signal.

At present, resetting OSNRs to acceptable levels in metropolitan WDM networks involves converting optical signals to electrical signals, processing the electrical signals, and converting the processed electrical signals into optical signals. This process, known as optical regeneration, or simply regeneration, boosts the OSNR but requires relatively expensive transponders. Unfortunately, the transponder complexity and cost increase with the data rate and the number of channels, making regeneration an unattractive option for maintaining OSNR in metro WDM networks.

SUMMARY OF THE INVENTION

A method or corresponding apparatus in an example embodiment of the present invention provides a procedure to plan a deployment of optical network elements (ONEs), such as optical amplifiers, in an optical network. An example embodiment of the procedure initializes models of ONEs within a topology of ONEs, where models of amplifiers include amplification and noise characteristics compatible with respective ONEs. After initialization, an optical signal-to-noise ratio (OSNR) margin table is computed as a function of the topology and the models of ONEs. Negative OSNR margins in the OSNR margin table represent optical regenerations within the topology. Next, the models of amplifiers in the topology are selectively replaced with models of different amplifiers with corresponding amplification and noise characteristics, and the OSNR margin table is recomputed in an attempt to reduce the number of negative OSNR margins. Amplifier replacement and OSNR recomputation continue for a given number of iterations until indications of amplifiers represented by the models of amplifiers are reported.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 2A and 2B are example optical signal-to-noise ratio (OSNR) margin tables according to an aspect of the present invention for an optical network with a ring topology.

FIG. 5A is a table that lists losses in links of a proposed optical network with a ring topology.

FIG. 5B is an example OSNR margin table for a model of a naïvely planned optical network with a ring topology.

FIG. 5C is an example OSNR margin table for a model of a optical network with a ring topology planned using an embodiment of the disclosed planning tool.

DETAILED DESCRIPTION OF THE INVENTION

A description of example embodiments of the invention follows.

Example embodiments of the present invention provide a method or apparatus for planning deployment of optical network elements (ONEs) in metropolitan wavelength-division multiplexing (WDM) networks.

Figure 1:
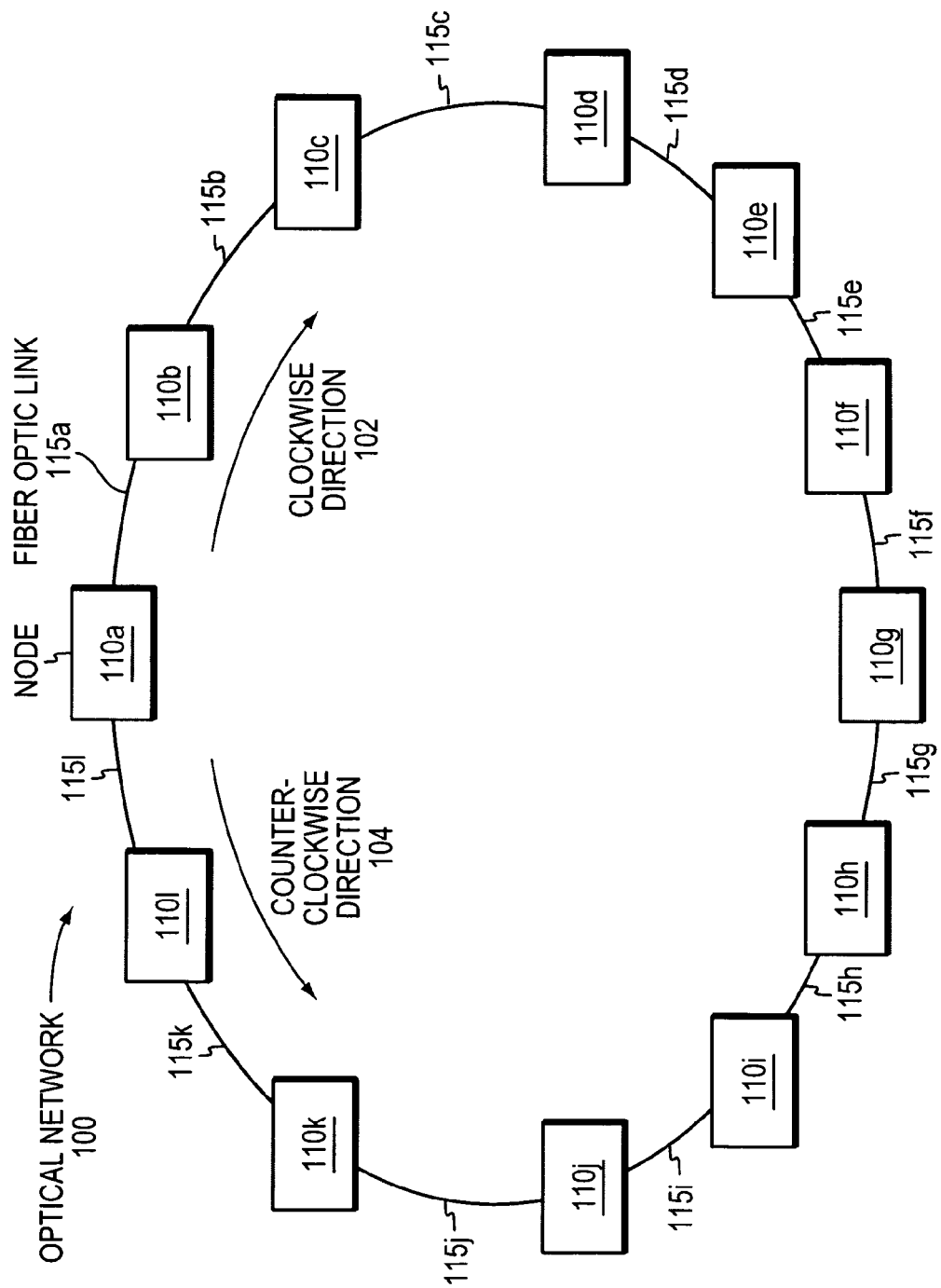
FIG. 1 is a block diagram of an optical network, the planning of which may be done using embodiments of the present invention.

FIG. 1 is a block diagram that illustrates an optical network 100 including a plurality of nodes 110a-l connected via a plurality of fiber optic links 115a-l. For example, node 115a connects to node 115b via a first fiber optic link 115a in a clockwise direction 102. In a counterclockwise direction 104, node 115a connects to node 115l via a second fiber optic link 115l. Typically, nodes include central offices, communications sites, communications devices, etc. The optical network 100 shown in FIG. 1 has a ring topology, whereas other optical networks may have other topologies including linear, mesh, unidirectional, bidirectional, or hybrid topologies. In addition, optical networks may have any number of nodes and fiber optic links, and links may include one or more fiber optic cables. In general, fiber optic links include at least one pair of fiber optic cables. The example methods and apparatus disclosed herein may be used to plan deployment of optical networks with any suitable topology, any number of nodes, and any number of fiber optic links.

In the example optical network 100 of FIG. 1, each node 115a-l belongs to a set of node pairs. For example, node 115a forms two adjacent node pairs, one with node 115b and the other with node 115l. Node 115a also forms nonadjacent node pairs with nodes 115c-k. Nonadjacent node pairs are connected via series of adjacent node pairs; for example, nodes 115a and 115d are connected in the clockwise direction 102 along a first path via nodes 115b and 115c, and in the counterclockwise direction 104 along a second path via nodes 115l-e. Other topologies and numbers of nodes may result in different numbers of adjacent and non-adjacent node pairs.

Modern optical networks, such as optical network 100 in FIG. 1, use WDM, including coarse WDM (CWDM) and dense WDM (DWDM), to increase the amount of data that can be transmitted through the network. WDM signals may propagate through ring networks, such as the optical network 100, in both clockwise and counterclockwise directions 102, 104, connecting each node pair via two paths. Alternatively, WDM signals may propagate through optical network 100 in only one direction, limiting each node pair to a single connection path. As signals propagate through the network, the signal power falls due to absorption, scattering, and other loss mechanisms, reducing the quality of the received transmission as discussed above.

One measure of the signal quality is the optical signal-to-noise ratio (OSNR), defined above as the ratio of the optical signal power to the optical noise power in a given channel bandwidth. An additional measure is an OSNR margin, which is defined herein as a difference between a predicted OSNR and a threshold OSNR required to maintain a predetermined bit error rate (BER) at a receiver associated with the link in question:

$$\text{OSNR Margin} = \text{Predicted OSNR} - \text{Threshold OSNR}. \qquad \text{Equation 3}$$

The predicted OSNR may include effects of optical impairments, such as four-wave mixing, polarization mode dispersion, chromatic dispersion, self-phase modulation, cross-phase modulation, and other mechanisms that may affect transmission performance.

According to the definition in Equation 3, an OSNR margin of zero (0) means that a detected signal will have a BER that meets a threshold BER, typically $10^{-12}$ for optical networks. In general, larger OSNR margins are better; margins equal to or less than zero (0) indicate unacceptably low OSNRs. In embodiments of the disclosed planning tool, OSNR margins equal to or less than zero indicate the need for optical regeneration to maintain sufficiently low BERs.

FIGS. 2A and 2B are example OSNR margin tables for a model of optical network with a ring topology that includes nine nodes labeled clockwise A-I. FIG. 2A shows the OSNR margin table for clockwise paths between node pairs, whereas FIG. 2B shows the OSNR margin table for counterclockwise paths between node pairs.

To read the tables, start at a node column, then move to the row with the blacked-out entry. For clockwise paths, read entries listed to the right of the blacked-out entry; for counterclockwise paths, read entries listed to the left of the blacked-out entry. The OSNR margin in the clockwise path between nodes C and F, for example, is 8.67 dB. In contrast, the OSNR margin in the counterclockwise path between nodes C and F is 4.68 dB. The counterclockwise OSNR margin table of FIG. 2B is the transpose of the clockwise OSNR margin table of FIG. 2A. The transpose relationship holds true for OSNR margin tables representing ring topologies, but may not hold true for other topologies.

In embodiments of the present invention, negative OSNR margins represent locations of transponders in the optical network. As transponders are expensive to operate and upgrade, example embodiments of the present invention provide a method for determining where transponders can be replaced by appropriately operating optical amplifiers or combinations of optical amplifiers. Embodiments of the present planning tool invention use a model of a naive optical network, such as the one shown in FIG. 1, to calculate an initial OSNR margin table. Then, the planning tool may selectively replace elements of the model optical network in an attempt to reduce the number of negative OSNR margins in the OSNR margin table. By reducing the number of negative OSNR margins, the planning tool reduces the number of transponders required in the optical network, leading to a final optical network that can be deployed at lower cost than the original, naïvely planned optical network.

Because transponders typically include a photodetector, electronic circuit, and source for each WDM channel, transponders capable of processing many channels are relatively expensive. Increasing the network capacity by adding channels—for example, by switching from WDM to DWDM—requires adding a corresponding number of photodetectors, circuits, and sources. Optical amplifiers, on the other hand, generally do not scale in complexity with the number of signals—a typical optical amplifier can amplify 40-80 signals just as easily as one signal.

Unlike in a transponder, all the signals in an optical amplifier may travel along the same physical path. (Eventually, power limits and gain competition among signals may limit the number of signals that a given amplifier can amplify.) Compared to transponders, optical amplifiers are simple and inexpensive, making them attractive for maintaining OSNR throughout metro WDM networks. Deploying optical amplifiers in a manner that maintains OSNRs throughout the network requires considering the optical amplifiers' noise characteristics and the network topology, among other parameters.

Naïvely inserting amplifiers into a network, however, does not necessarily boost the OSNR. Optical amplifiers boost signal power, but add amplified spontaneous emission (ASE) noise to the emitted signal. Even ideal optical amplifiers cannot amplify signals without adding noise. In general, an amplifier's noise performance is specified in terms of a noise figure F, defined as the ratio of the input OSNR (assumed to be at the shot-noise limit) to the output OSNR:

$$F = \frac{OSNR_{in}}{OSNR_{out}}.$$  Equation 4

Lower noise figures indicate better performance. Typical erbium-doped fiber amplifiers (EDFAs) have noise figures of 6-8 dB. By comparison, ideal optical amplifiers have noise figures of 3 dB (i.e., a factor of 2).

To see how amplification degrades OSNR, consider an optical signal in the shot-noise limit with an optical power of −10 dBm and an OSNR of 30 dB. Amplifying this signal with an optical amplifier with a 16 dB gain and a 10 dB noise figure increases the power to 6 dBm and reduces the OSNR to 20 dB—the optical power grows by 16 dB, but the optical noise power grows by 26 dB (16 dB of gain and the 10 dB noise figure). In contrast, amplifying the same signal with an optical amplifier with a 10 dB gain and a 6 dB noise figure only increases the power to 0 dBm, but reduces the OSNR to 24 dB.

Fortunately, there are a number of ways to achieve high gain and good noise performance with optical amplifiers. For example, cascading amplifiers with high noise figures behind an amplifier with a low noise figure results in a net amplification with a higher effective gain than any of the amplifiers by themselves and a relatively low effective noise figure. The effective noise figure of cascaded amplifiers is given by the Friis formula, $$F_{net} = F_1 + \frac{F_2 - 1}{G_1} + \frac{F_3 - 1}{G_1 G_2} + \frac{F_4 - 1}{G_1 G_2 G_3} + \dots,$$  Equation 5 where $F_n$ and $G_n$ are the noise figure and gain, respectively, of the $n^{th}$ amplifier in the cascade. For example, cascading a first EDFA with a 980 nm pump source (i.e., a low-noise EDFA) ahead of a second EDFA with a 1480 nm pump source (i.e., a high-power EDFA) yields a gain substantially equal to that of the second EDFA with noise figure substantially equal to that of the first EDFA.

Another way to achieve low-noise optical amplification is to amplify a signal with an optical amplifier operating in a regime where the ASE noise is at a minimum. For example, operating an optical amplifier in saturation reduces ASE noise power by reducing the number of photoelectrons available for spontaneous emission. ASE noise power also varies nonlinearly with pump power: generally, ASE noise power grows faster than gain does with respect to pump power. Embodiments of the disclosed planning tool exploit the nonlinear variation of ASE power with pump power to substitute high-power optical amplifiers operating at low gain to maintain sufficient OSNR without resorting to optical regeneration. Replacing low-gain amplifiers with high-gain amplifiers to reduce network cost is somewhat counterintuitive, as high-gain amplifiers generally cost more than low-gain amplifiers. However, using high-gain amplifiers instead of low-gain amplifiers may be less expensive than installing transponders.

Figure 3:
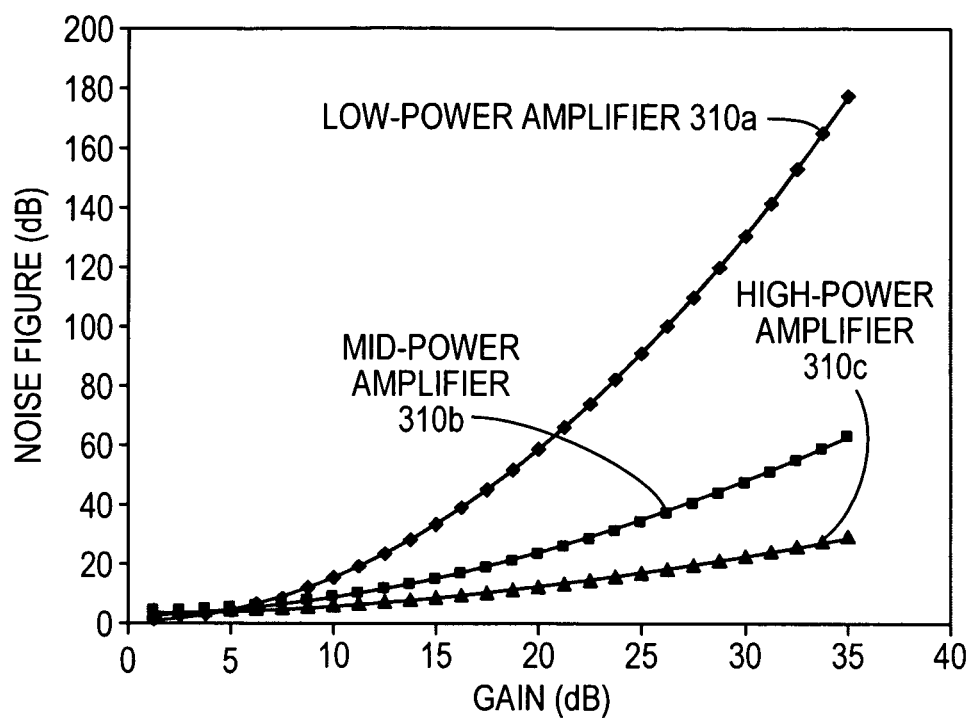
FIG. 3 is graph of that shows representative curves of noise figure versus gain for low-, mid-, and high-power optical amplifiers.

FIG. 3 is a graph that shows representative curves of noise figure versus gain for typical optical amplifiers on a logarithmic-logarithmic scale. Curves 310a-c represent ASE power for optical amplifiers with different gain ratings. At low gain, the noise figure remains relatively flat, then grows dramatically; FIG. 3 shows that noise figure grows more quickly with gain for low-power amplifiers than for high-power amplifiers.

FIG. 3 shows that nominally high-gain optical amplifiers operated at a given gain setting have better noise performance that low-gain optical amplifiers operated at the same gain setting. For example, the low-gain amplifier represented by curve 310a has a noise figure of about 60 dB when operated at a gain of 20 dB, whereas the high-gain amplifier represented by curve 310c has a noise figure of about 10 dB at the same gain. This generally holds true for all optical amplifiers, including Raman amplifiers, solid-state optical amplifiers, and fiber-based amplifiers that use rare-earth ions (e.g., EDFAs).

Returning to FIG. 1, one way to improve OSNR in a fiber optic link 115a-l is to replace a low-gain optical amplifier operating at its highest gain setting at a node 110a-l with a high-gain optical amplifier operating at its lowest gain setting. Another way to improve the OSNR in a given link 115a-l is to use a low-gain, low-noise optical amplifier cascaded before a high-gain, high-noise optical amplifier. The disclosed planning tool provides a method for determining the placement and configuration of optical amplifiers in optical networks to guarantee a minimum OSNR throughout the optical network, leading to a reduction in the number of transponders in the optical network. The example methods and apparatus disclosed herein may be used to plan deployment of optical networks with any suitable type and number of optical amplifiers.

Figure 4:
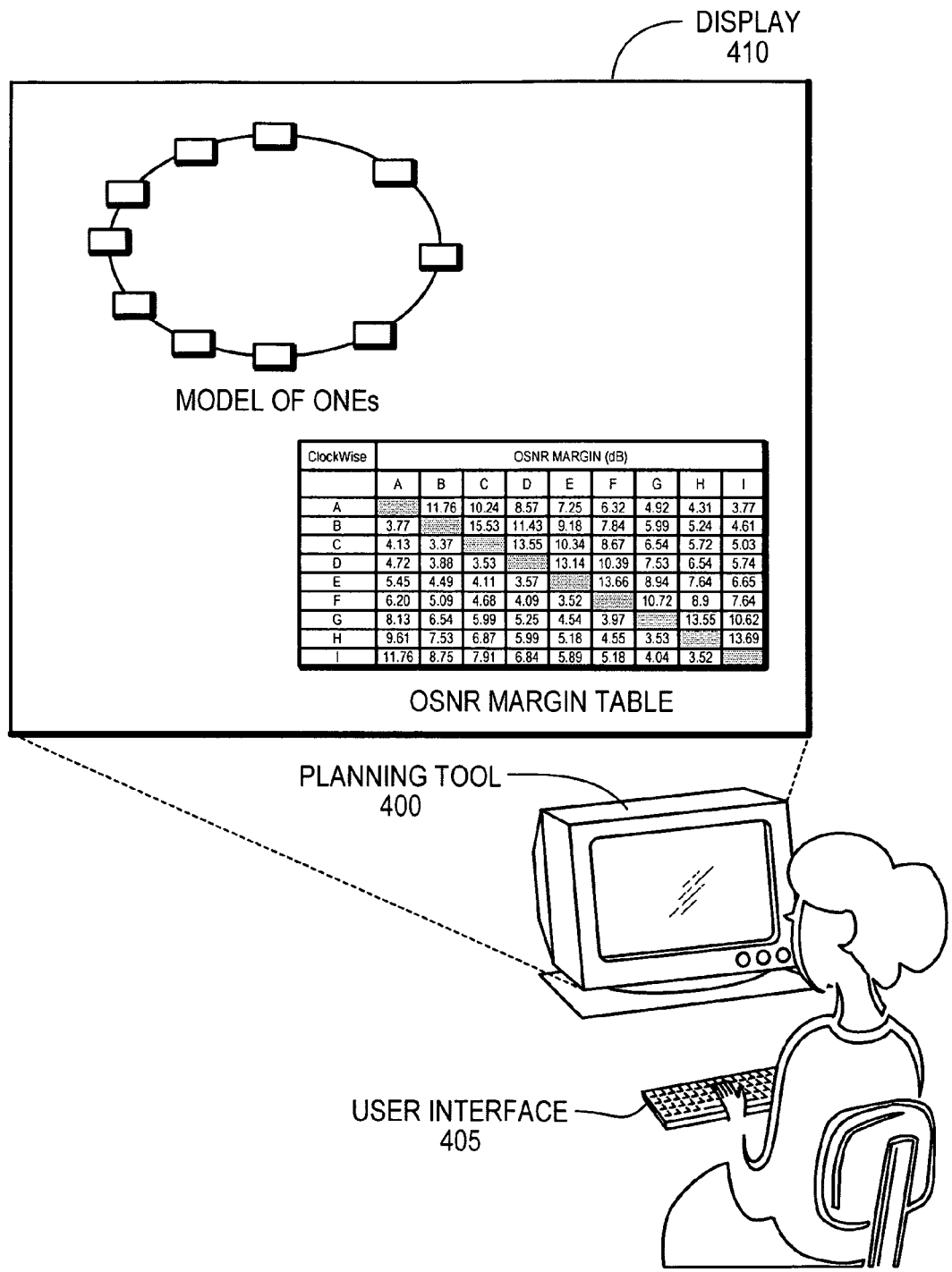
FIG. 4 is a schematic view of a user planning the deployment of an optical network using an example embodiment of the present invention.

FIG. 4 is a schematic view of a user planning the deployment of an optical network using an example embodiment 400 of the disclosed planning tool. To use the example planning tool 400, the user enters characteristics of the proposed optical network via a user interface 405, such as a keyboard. Typical characteristics of the planned optical network include the network topology, the number and distribution of nodes, and the number, distribution, and type of ONEs, including transponders and optical amplifiers. The user may also enter the expected or measured loss between nodes, or the planning tool 400 may estimate the loss based on distance between nodes, optical fiber type, and other parameters.

Once the user finishes creating the model of the optical network, the planning tool 400 computes an OSNR margin table based on loss between nodes and characteristics of the optical amplifiers to be deployed. In certain embodiments, the planning tool 400 may use preloaded models of optical amplifiers based on measurements of real optical amplifiers. In other embodiment, the planning tool 400 may use models defined by the user, including models of hypothetical amplifiers.

After calculating the OSNR margin table, the planning tool 400 iterates through different arrangements of optical amplifiers in the model optical network, computing the OSNR margin table for each iteration in an attempt to minimize the number of negative OSNR margins in the table. Once the planning tool 400 completes the iterations, it reports indications of the final model to the user via a display 410. For example, the display 410 might show the model of the optical network and the OSNR margin table in a graphical user interface. In some embodiments, the planning tool 400 reports results only after iterating ends, whereas other embodiments of the planning tool 400 report intermediate results.

FIG. 5A is a table showing loss for different links in a naïvely planned optical network. The network has a ring topology with twelve nodes labeled A through I distributed along the ring in a clockwise fashion. Referring to FIG. 4, a user may enter the loss table of FIG. 5A into the planning tool 400 when specifying a model optical network during the planning stages of deploying an optical network. In general, loss correlates with propagation distance: propagating over longer distances incurs higher loss.

FIG. 5B is an example of an OSNR margin table computed for traffic traveling from node A to the other nodes of the model of the naive optical network of FIG. 5A using an example embodiment of the disclosed planning tool. In calculating the OSNR margin table of FIG. 5A, the planning tool assumes three different amplifiers: 1) a low-gain amplifier ("LOW") with a gain of 6-16 dB; 2) a medium-gain amplifier ("MED") with a gain of 12-24 dB; and 3) a high-gain amplifier ("HIGH") with a gain of 20-35 dB. The three amplifiers have noise figure characteristics similar to those shown in FIG. 3. To compute the predicted OSNR, the planning tool 400 computes the anticipated loss, anticipated gain, and noise figure based on the values entered for the proposed network. The OSNR for signals propagating between nodes depends on the value of the net noise figure for the amplifiers cascaded between the nodes in question according to Equation 5. Given the dominance of the noise figure of the first amplifier in the cascade, intelligently replacing a noisy amplifier at one node can dramatically affect transmission from that one node to every other node.

According to the OSNR margin table shown in FIG. 5B, signals propagating from node A to nodes G-L in the clockwise direction have negative OSNR margins, as do signals propagating from node A to nodes B-G in the counterclockwise direction. Signals traveling along reciprocal paths experience the same loss, assuming the absence of nonreciprocal components, such as isolators or Faraday rotators. To reduce the number of negative OSNR margins, the planning tool replaces the models of amplifiers listed in the OSNR margin table with models of different amplifiers.

FIG. 5C is an example of an OSNR margin table computed for the model of an optical network of FIG. 5A revised using an example embodiment of the disclosed planning tool. There are two significant differences between the OSNR margin table of FIG. 5B and the OSNR margin table of FIG. 5C: the OSNR margin table of FIG. 5C contains no negative OSNR margins, and the OSNR margin table of FIG. 5C lists a different arrangement of optical amplifiers. In this example, low-gain amplifiers operating at relatively high gain are replaced with high-gain amplifiers operating relatively low gain to eliminate regenerations due to unacceptable OSNRs. For example, the planning tool may replace a low-gain amplifier operating at a gain of 14 dB with a high-gain amplifier operating at the same gain.

Figure 6:
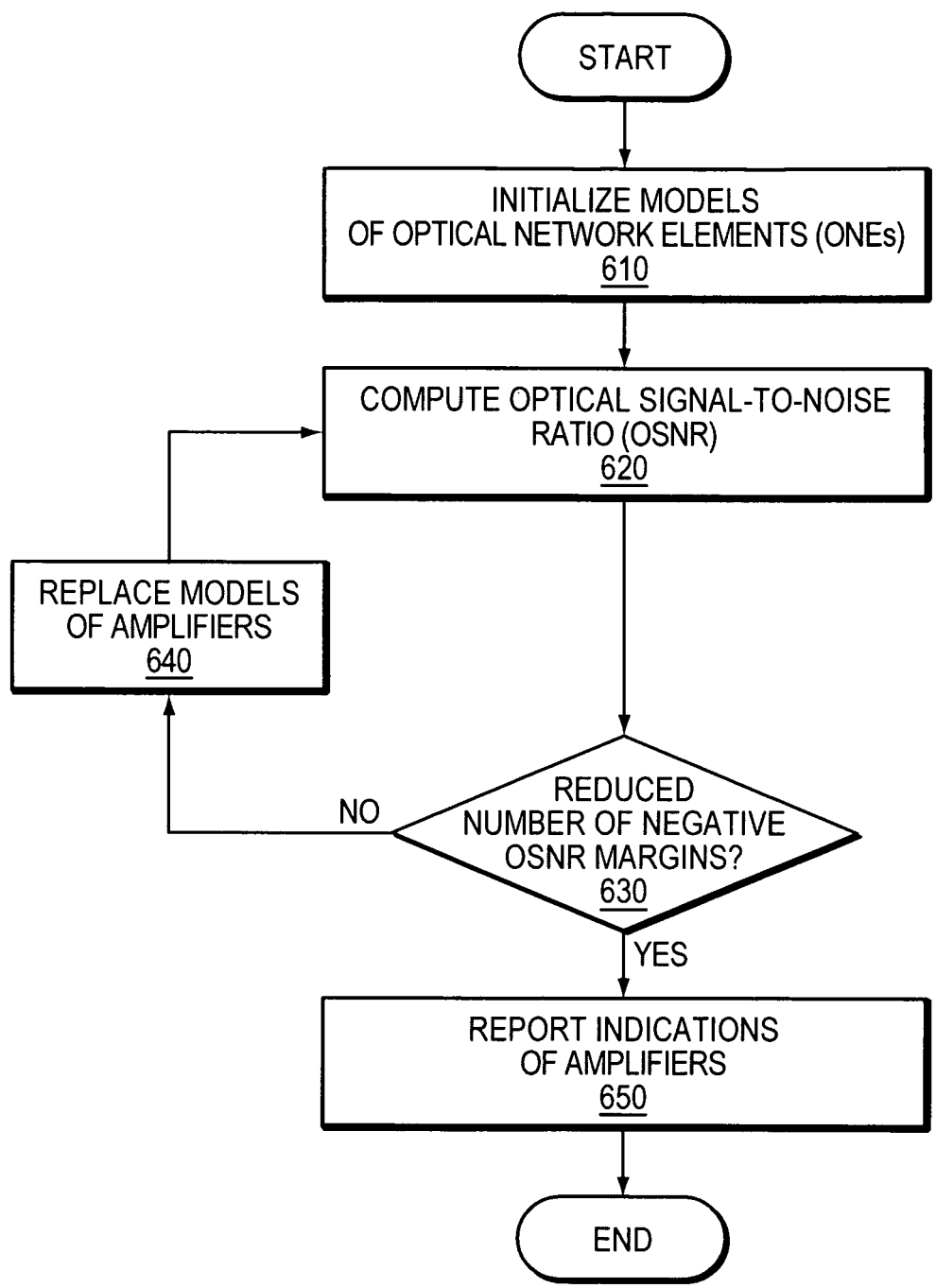
FIGS. 6 and 7 are flow charts representative of example methods of reducing cost of optical amplification.

FIG. 6 is a flow chart that illustrates an example method of planning the deployment of an optical network according to the disclosed planning tool. Planning begins with the initialization of models of optical network elements (ONEs) within a given network topology (610), where the models include models of optical amplifiers with predetermined amplification and noise characteristics. In some embodiments, the models may correspond to measured characteristics of production or experimental devices; other embodiments may use predicted characteristics for actual or hypothetical devices.

After initialization, the planning tool computes an OSNR margin table, such as the one shown in FIGS. 5B, as a function of the network topology and the models of ONEs (620). Next, the embodiments of the planning tool begin an optimization routine that attempts to minimize the number of negative OSNR margins in the OSNR margin table. By minimizing the number of negative OSNR margins, the planning tool creates an ONE deployment plan that minimizes the number of optical regenerations, reducing the cost of deploying the network. In some embodiments, the planning tool iterates through a loop of replacing the models of amplifiers with models of different amplifiers, then recomputing the OSNR margin table (620, 630, 640). Once the planning tool completes a given number of iterations, it reports to the user indications of a final selection of the models of amplifiers in the model of the network (650).

Figure 7:
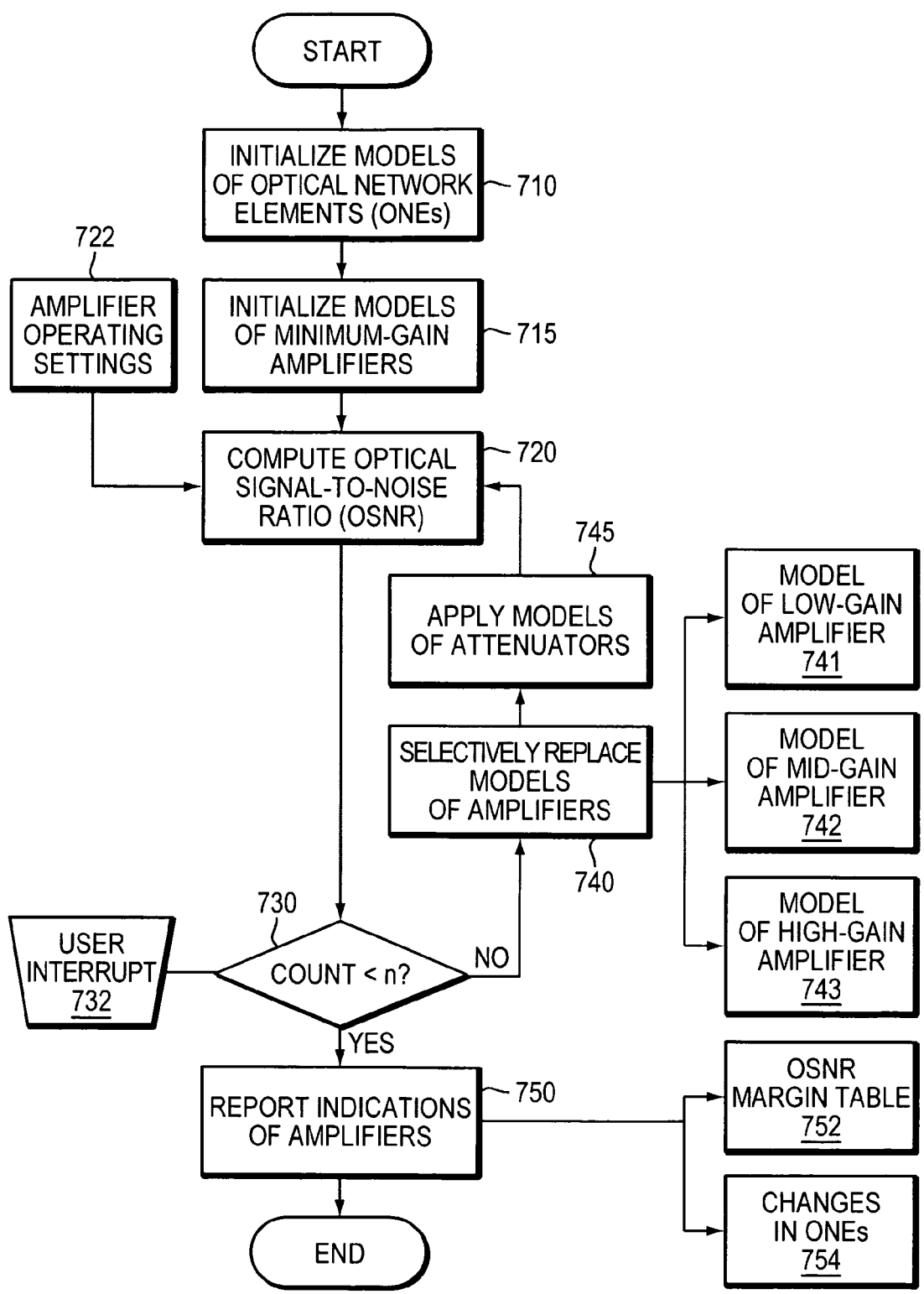

FIG. 7 is a flow chart that illustrates a second example method of planning the deployment of an optical network according to the disclosed planning tool. As in the example illustrated in FIG. 6, planning begins with the initialization of models of ONEs (710) within a given network topology, which may be a ring, mesh, hybrid ring/mesh, or any other suitable topology. The models of ONEs include models of optical amplifiers with predetermined amplification and noise characteristics, such as operating wavelength, gain profile, small-signal gain, polarization-dependent gain, noise figure, maximum input power, maximum output power, and isolation ratio. In one example, the models of amplifiers may be initialized at a minimum gain setting (715).

Next, the planning tool calculates the OSNR margin table (720), possibly accounting for the operating settings of the modeled optical amplifiers (725). The planning tool then enters a loop controlled by an iteration count (730), selectively replacing the models of amplifiers with different models of amplifiers (740). To be eligible for replacement, the models of amplifiers may have to belong to a given subset of models of amplifiers. Alternatively, the planning tool may impose global constraints on the model, such as a maximum total number of amplifiers, that assert themselves during replacement.

In some embodiments, the planning tool may choose from models of low-, mid-, and high-gain amplifiers (741-743). The planning tool may also apply models of optical attenuators in conjunction with the optical amplifiers to meet desired gain and noise-figure performance (745). Depending on the embodiment, the models of attenuators may represent fixed attenuators, variable attenuators, shutter-based attenuators, bend-loss attenuators, or any other suitable type of optical attenuator.

The planning tool iterates through the loop (720, 730, 740, 745) until the number of iterations equals a given number. At most, the number of iterations should be no more than the product of the total number of initialized models of ONEs and the number of different types of models of amplifiers. Alternative embodiments may iterate through the loop until the number of negative OSNR margins converges or until a given iteration time elapses. Still other embodiments may stop iterating in response to a user interrupt, possibly in the form of a user-determined number of iterations (732). The planning tool may also iterate conditionally: for example, the planning tool may iterate through either a fixed number or convergence of the number of negative OSNR margins, whichever occurs first.

The planning tool may determine an optimum deployment pattern using any suitable method. For example, the planning tool may perform a brute-force calculation: it may calculate all possible arrangements of amplifiers, then pick the optimum arrangement. The brute-force approach works with small numbers of arrangements, but often requires too much time and/or memory for large numbers of arrangements. Alternatively, the planning tool may optimize by minimizing (or maximizing) a figure of merit with a least-squares estimation technique, such as the singular value decomposition method or the Levenberg-Marquardt method. The planning tool may also perform a search in a multidimensional space using the downhill simplex (Nelder-Mead) method, Powell's method, simulated annealing, genetic algorithms, or any other suitable algorithm.

Once the planning tool completes the iterative replacing, it may report results to a user (750). The planning tool may report indications of the final selection of models of amplifiers, including the model location, model type, and differences between the models as initialized and the models as reported. In some embodiments, the planning tool may report indications of the number, location, and changes in number and location of transponders within the modeled optical network. The planning tool may also report the OSNR margin table in tabular form (e.g., the OSNR margin table shown in FIG. 5C), graphical form, or both.

Figure 8:
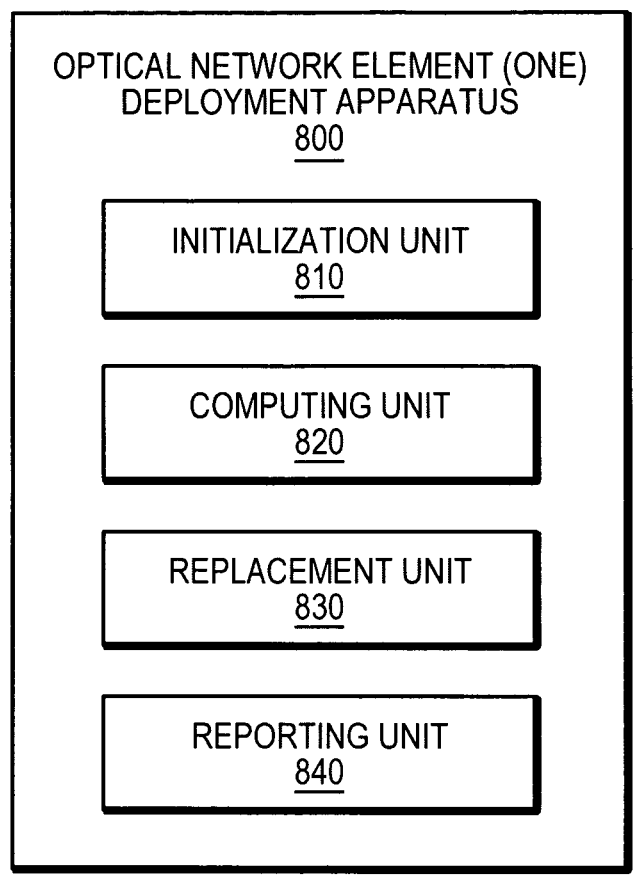
FIGS. 8 and 9 are block diagrams of example embodiments of an optical network element (ONE) deployment apparatus.

FIG. 8 is a block diagram that illustrates an example embodiment of an ONE deployment planning apparatus 800 according to the disclosed planning tool. The apparatus models an optical network, such as the one shown in FIG. 1, to determine the most appropriate deployment of the optical network. The apparatus 800 includes an initialization unit 810, computing unit 820, replacement unit 830, and reporting unit 840. The initialization unit 810 initializes models of ONEs in a network topology; the computing unit 820 calculates an OSNR margin table for the initialized model; the replacement unit 830 replaces the models of amplifiers with models of different amplifiers, forwards the resulting network model to the computation unit 820 for recalculation of the OSNR margin table, and determines when no further replacements are desired; and the reporting unit 840 outputs an indication of the final selection of models of amplifiers to a user.

Figure 9:
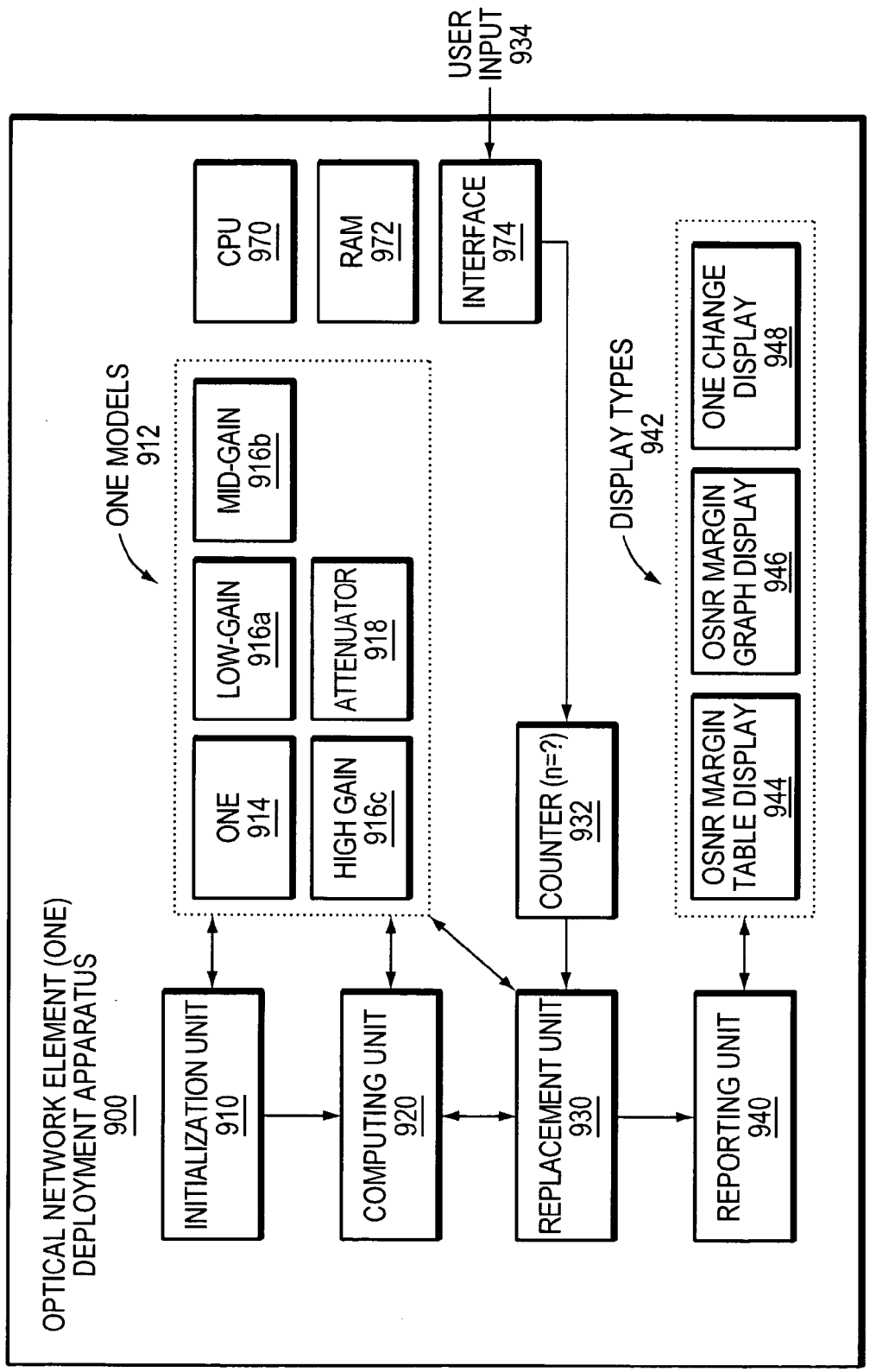

FIG. 9 is a block diagram that illustrates a second example embodiment of an ONE deployment planning apparatus 900 according to the disclosed planning tool. Like the example shown in FIG. 8, the apparatus 900 includes initialization, computation, replacement, and reporting units 910, 920, 930, 940, which may be managed by a central processing unit (CPU) 970 operating in conjunction with a random access memory (RAM) 972. In the apparatus 900, the initialization unit 910 initializes a model of an optical network using a group of ONE models 912 that includes models of generic ONEs 1014, such as optical splitter/combiners, WDMs, optical network terminals, and optical line terminals. The group of ONE models 912 also includes models of attenuators 918 and models of low-, mid-, and high-gain optical amplifiers 916a-c, where the models of amplifiers 916a-c include information about the amplifier operating settings. The initialization unit 910 may initialize the models of optical amplifiers 916a-c at their respective minimum gain settings. The optical network being modeled may have ring, mesh, linear, hybrid, or any other suitable topology.

Once the initialization unit 910 completes initializing the model of the optical network, the computation unit 920 calculates an OSNR margin table for the nodes in the network. The computation unit 920 may refer to the operating settings of the models of optical amplifiers 916a-c during calculation of the OSNR margin table.

Next, the replacement unit 930 determines whether or not to replace the models of optical amplifiers 916a-c with models of different optical amplifiers 916a-c. If all the OSNR margins are greater than zero (0), the replacement unit 930 may forward the OSNR margin table to the reporting unit 940. Otherwise, the replacement unit 930 may replace selected models of optical amplifiers 916a-c in the model of the optical network with models of different optical amplifiers 916a-c. The replacement unit 930 may also remove models of amplifiers, substitute models of cascaded optical amplifiers 916a-c, or substitute models of identical optical amplifiers 916a-c with different operating settings. After finishing its substitutions, the replacement unit 930 forwards the model of the optical network to the computation unit 920 for recalculation of the OSNR margin table.

The replacement unit 930 may repeat this cycle for a fixed number of iterations, where a counter 932 tracks the total number of iterations and the current iteration number. The number of iterations may be preset, fixed by the user, or equal to the product of the total number of models of ONEs in the model of the optical network and the number of different amplifier models 916a-c. Alternatively, the replacement unit 930 may halt the replacement/recomputation loop in response to a user input 934 transmitted through an interface 974. The replacement unit 930 may also halt the replacement/recomputation loop when the number of negative OSNR margins converges. Conditional halts may also be used to terminate the replacement/recomputation loop.

Once the replacement/recomputation loop halts, the reporting unit 940 reports at least one of a variety of different display types 942 to a user. For example, the reporting unit 940 may report indications of the final selection of models of amplifiers, including the model location, model type, and differences between the models as initialized and the models as reported. In some embodiments, the reporting unit 940 may also report an ONE change display 948 indicating any or all of the number, location, and changes in number and location of transponders within the modeled optical network. The reporting unit 940 may also report the OSNR margin table in tabular form 944, graphical form 946, or both.

It should be understood that the examples presented herein can include more or fewer components, be partitioned into subunits, or be implemented in different combinations. Moreover, the flow diagrams of FIGS. 6 and 7 may be implemented in hardware, firmware, or software. If implemented in software, the software may be written in any suitable software language. The software may be embodied on any form of computer readable medium, such Random Access Memory (RAM), Read-Only Memory (ROM), or magnetic or optical disk, and loaded and executed by generic or custom processor(s).

While this invention has been particularly shown and described with references to example embodiments thereof, it will be understood by those skilled in the art that various changes in form and details may be made therein without departing from the scope of the invention encompassed by the appended claims.

What is claimed is:

1. A method of planning deployment of optical network elements (ONEs) in a processor of an electronic device, the method comprising:
   in the processor of the electronic device, the processor operatively coupled to at least one memory, initializing models of ONEs within a topology of ONEs with a model of an amplifier with amplification and noise characteristics compatible with respective ONEs, the topology being a representation of a real world optical network topology stored in the at least one memory;
   in the processor of the electronic device, computing an optical signal-to-noise ratio (OSNR) margin table as a function of the topology and model of amplification and noise characteristics, negative OSNR margins in the OSNR margin table representing optical regenerations within the topology;
   in the processor of the electronic device, iteratively replacing models of low-gain amplifiers operating at a high gain setting within a range of operating gain settings for the models of low-gain amplifiers with models of high-gain amplifiers operating at a low gain setting within a range of operating gain settings for the models of high-gain amplifiers with corresponding amplification and noise characteristics within at least a subset of the models of ONEs and recomputing the OSNR margin table to change the representation of the real world optical network topology by reducing the number of negative OSNR margins within the OSNR margin table to reduce the corresponding optical regenerations within the topology stored in the at least one memory; and
   in the processor of the electronic device, reporting indications of amplifiers represented by the models of amplifiers after a given number of iterations.

2. The method of claim 1 wherein initializing the models of ONEs includes initializing models of amplifiers with a minimum level of amplification.

3. The method of claim 1 wherein iteratively replacing the models of amplifiers includes selecting models of amplifiers providing capacities of low, middle, and high levels of amplification.

4. The method of claim 1 wherein iteratively replacing the models of amplifiers further includes restricting a subset of ONEs at which the iterative replacing is allowed.

5. The method of claim 1 further including applying models of attenuators in association with the models of amplifiers and computing or recomputing the OSNR margin table further with the models of attenuators taken into consideration.

6. The method of claim 1 wherein computing or recomputing the OSNR margin table includes taking operating gain settings of the amplifiers into consideration.

7. The method of claim 1 wherein the given number of iterations is selected from a group consisting of: a fixed number, a convergence of at least a subset of the OSNR margins, a number performed in a period of time, a combination of at least a subset of ONEs and a respective number of amplifiers, and a user-determined number.

8. The method of claim 1 wherein reporting the indications of amplifiers includes reporting the OSNR margin table.

9. The method of claim 1 wherein reporting the indications of amplifiers includes reporting a number and location of optical regenerations within the topology.

10. The method of claim 1 wherein reporting the indications of amplifiers includes displaying the OSNR margin table in tabular form, graphical form, or both.

11. The method of claim 1 wherein reporting the indications of amplifiers includes reporting indications of which models of amplifiers changed between the initializing and reporting and indications of which corresponding optical regenerations were eliminated between the initializing and reporting.

12. The method of claim 1 wherein the topology is a ring or a mesh topology.

13. An apparatus to plan deployment of optical network elements (ONEs), the apparatus comprising:
   a processor and memory implementing:
      an initialization unit configured to initialize models of ONEs within a topology of ONEs with a model of an amplifier with amplification and noise characteristics compatible with respective ONEs;
      a computing unit configured to compute an optical signal-to-noise ratio (OSNR) margin table as a function of the topology and model of amplification and noise characteristics, optical regenerations within the topology represented by negative OSNR margins in the OSNR margin table;
      a replacement unit configured to iteratively replace models of low-gain amplifiers operating at a high gain setting within a range of operating gain settings for the models of low-gain amplifiers with models of high-gain amplifiers operating at a low gain setting within a range of operating gain settings for the models of high-gain amplifiers with corresponding amplification and noise characteristics within at least a subset of the models of ONEs;
      the computing unit further configured to recompute the OSNR margin table to reduce the number of negative OSNR margins within the OSNR margin table to reduce the corresponding optical regenerations within the topology; and
      a reporting unit configured to report indications of amplifiers represented by the models of amplifiers after a given number of iterations.

14. The apparatus of claim 13 wherein the initialization unit initializes a model of an amplifier that includes a minimum level of amplification.

15. The apparatus of claim 13 wherein the computing unit is further configured to iteratively replace models of amplifiers with models of different amplifiers providing capacities of low, middle, and high levels of amplification.

16. The apparatus of claim 13 wherein the computing unit is further configured to restrict a subset of ONEs at which iterative replacing is allowed.

17. The apparatus of claim 13 wherein the computing unit is further configured to apply models of attenuators in association with the models of amplifiers and compute or recompute the OSNR margin table with the models of attenuators taken into consideration.

18. The apparatus of claim 13 wherein the computing unit is further configured to take operating gain settings of the amplifiers into consideration.

19. The apparatus of claim 13 wherein the replacement unit is further configured to iteratively replace the models of amplifiers for a number of iterations selected from a group consisting of: a fixed number, a convergence of at least a subset of the OSNR margins, a number performed in a period of time, and a combination of at least a subset of ONEs and a respective number of amplifiers, and a user-determined number.

20. The apparatus of claim 13 wherein the reporting unit is further configured to report the OSNR margin table.

21. The apparatus of claim 13 wherein the reporting unit is further configured to report a number and location of optical regenerations within the topology.

22. The apparatus of claim 13 wherein the reporting unit is further configured to display the OSNR margin table in tabular form, graphical form, or both.

23. The apparatus of claim 13 wherein the reporting unit is further configured to report indications of which models of amplifiers changed between initialization and reporting and indications of which corresponding optical regenerations were eliminated between initialization and reporting.

24. The apparatus of claim 13 wherein the topology is a ring or a mesh topology.

25. A non-transitory computer readable medium having a computer readable program, the computer readable program, when executed by a computer, causing the computer to:
  initialize models of optical network elements (ONEs) within a topology of ONEs with a model of an amplifier with amplification and noise characteristics compatible with respective ONEs;
  compute an optical signal-to-noise ratio (OSNR) margin table as a function of the topology and model of amplification and noise characteristics, optical regenerations within the topology represented by negative OSNR margins in the OSNR margin table;
  iteratively replace models of low-gain amplifiers operating at a high gain setting within a range of operating gain settings for the models of low-gain amplifiers with models of high-gain amplifiers operating at a low gain setting within a range of operating gain settings for the models of high-gain amplifiers with corresponding amplification and noise characteristics within at least a subset of the models of ONEs;
  recompute the OSNR margin table to reduce the number of negative OSNR margins within the OSNR margin table to reduce the corresponding optical regenerations within the topology; and
  report indications of amplifiers represented by the models of amplifiers after a given number of iterations.

26. The method of claim 1 wherein the negative OSNR margins in the OSNR margin table represent locations of transponders in the optical network.

27. The method of claim 1 wherein reporting indications of amplifiers represented by the models of amplifiers after a given number of iterations includes differences between the models of amplifiers as initialized and the model of amplifiers as reported.

28. The method of claim 1 wherein the models of amplifiers belong to a given subset of models of amplifiers to be eligible for replacement.

29. The apparatus of claim 13 wherein the topology of ONEs is a representation of a real world topology of ONEs stored in the memory and further wherein to reduce the corresponding optical regenerations within the topology the computing unit is further configured to change the representation of the real world topology of ONEs stored in the memory.

30. The non-transitory computer medium of claim 25 wherein the topology of ONEs is a representation of a real world topology of ONEs stored in the memory and further wherein to reduce the corresponding optical regenerations within the topology the computer is further caused to change the representation of the real world topology of ONEs stored in the memory.

* * * * *